(12) United States Patent
Danilov et al.

(10) Patent No.: US 11,960,441 B2
(45) Date of Patent: *Apr. 16, 2024

(54) RETENTION MANAGEMENT FOR DATA STREAMS

(71) Applicant: EMC IP Holding Company LLC, Hopkinton, MA (US)

(72) Inventors: Mikhail Danilov, Saint Petersburg (RU); Igor Medvedev, Seattle, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/164,744

(22) Filed: Feb. 6, 2023

(65) Prior Publication Data

US 2023/0185763 A1    Jun. 15, 2023

Related U.S. Application Data

(62) Division of application No. 16/864,892, filed on May 1, 2020, now Pat. No. 11,604,759.

(51) Int. Cl.
*G06F 7/00* (2006.01)
*G06F 16/11* (2019.01)
(Continued)

(52) U.S. Cl.
CPC ........ *G06F 16/125* (2019.01); *G06F 16/1734* (2019.01); *G06F 16/182* (2019.01); *G06F 16/24568* (2019.01)

(58) Field of Classification Search
CPC ............ G06F 16/24568; G06F 16/182; G06F 16/1734; G06F 16/125
(Continued)

(56) References Cited

U.S. PATENT DOCUMENTS 3,617,587 A   11/1971  Nayar et al.
5,826,977 A   10/1998  Fowler et al.
(Continued)

FOREIGN PATENT DOCUMENTS

CA   2534170 A1   7/2007
CA   2672879 A1   4/2008
(Continued)

OTHER PUBLICATIONS

Notice of Allowance dated Nov. 15, 2022 for U.S. Appl. No. 16/864,892, 48 pages.
(Continued)

*Primary Examiner* — Md I Uddin
(74) *Attorney, Agent, or Firm* — Amin, Turocy & Watson, LLP

(57) ABSTRACT

The described technology is generally directed towards managing data retention policy for stream data stored in a streaming storage system. When a request to truncate a data stream from a certain position (e.g., from a request-specified stream cut) is received, an evaluation is made to determine whether the requested position is within a data retention period as specified by data retention policy. If any data prior to the stream cut position (corresponding to a stream cut time) is within the data retention period, the truncation request is blocked. Otherwise truncation from the stream cut point is allowed to proceed/is performed. Also described is handling automated (e.g., sized based) stream truncation requests with respect to data retention.

20 Claims, 11 Drawing Sheets

(51) Int. Cl.
*G06F 16/17* (2019.01)
*G06F 16/182* (2019.01)
*G06F 16/2455* (2019.01)

(58) Field of Classification Search
USPC .............................. 707/694, 752, 769, 692
See application file for complete search history.

(56) References Cited

U.S. PATENT DOCUMENTS

| | | |
|---|---|---|
| 7,107,419 B1 | 9/2006 | Ghemawat et al. |
| 7,340,690 B2 | 3/2008 | Lau |
| 7,430,570 B1 | 9/2008 | Srinivasan et al. |
| 7,610,437 B2 | 10/2009 | Sinclair et al. |
| 7,769,717 B2 | 8/2010 | Federwisch et al. |
| 7,984,084 B2 | 7/2011 | Sinclair |
| 8,285,918 B2 | 10/2012 | Maheshwari |
| 8,443,263 B2 | 5/2013 | Selinger et al. |
| 8,572,091 B1 | 10/2013 | Sivasubramanian et al. |
| 8,655,825 B2 | 2/2014 | Roesch et al. |
| 8,732,403 B1 | 5/2014 | Nayak |
| 8,825,848 B1 | 9/2014 | Dotan et al. |
| 8,873,284 B2 | 10/2014 | Sinclair et al. |
| 8,984,248 B2 | 3/2015 | Morishita et al. |
| 9,223,693 B2 | 12/2015 | Sinclair et al. |
| 9,336,133 B2 | 5/2016 | Sinclair et al. |
| 9,348,746 B2 | 5/2016 | Sinclair et al. |
| 9,407,521 B1 | 8/2016 | Kulkarni |
| 9,465,731 B2 | 10/2016 | Sinclair et al. |
| 9,514,018 B2 | 12/2016 | Sikri |
| 9,591,316 B2 | 3/2017 | Bracha et al. |
| 9,639,589 B1 | 5/2017 | Theimer |
| 9,652,307 B1 | 5/2017 | Soman et al. |
| 9,715,434 B1 | 6/2017 | Xu et al. |
| 9,734,050 B2 | 8/2017 | Sinclair et al. |
| 9,734,911 B2 | 8/2017 | Sinclair et al. |
| 9,753,932 B1 | 9/2017 | Brow et al. |
| 9,778,855 B2 | 10/2017 | Sinclair |
| 9,892,803 B2 | 2/2018 | Reed |
| 9,898,482 B1 | 2/2018 | Bono |
| 9,965,215 B1 | 5/2018 | Vazhenin et al. |
| 10,108,543 B1 | 10/2018 | Duggal et al. |
| 10,108,544 B1 | 10/2018 | Duggal et al. |
| 10,120,613 B2 | 11/2018 | Sinclair et al. |
| 10,133,490 B2 | 11/2018 | Sinclair et al. |
| 10,255,179 B2 | 4/2019 | Ji et al. |
| 10,277,524 B1 | 4/2019 | Kaitha et al. |
| 10,338,834 B1 | 7/2019 | Dighe et al. |
| 10,338,958 B1 | 7/2019 | Kamboj et al. |
| 10,430,279 B1 | 10/2019 | Dittia et al. |
| 10,565,208 B2 | 2/2020 | Triou, Jr. et al. |
| 10,628,424 B2 | 4/2020 | Park et al. |
| 10,705,741 B1 | 7/2020 | Varadarajan et al. |
| 10,795,812 B1 | 10/2020 | Duggal et al. |
| 10,860,457 B1 | 12/2020 | Evenson et al. |
| 10,867,033 B2 | 12/2020 | Keren et al. |
| 10,891,228 B2 | 1/2021 | Burow |
| 10,909,174 B1 | 2/2021 | Martin et al. |
| 10,929,322 B2 | 2/2021 | McDonald et al. |
| 10,983,715 B2 | 4/2021 | Sharoni et al. |
| 11,016,826 B2 | 5/2021 | Ehmann |
| 11,086,537 B2 | 8/2021 | Byun |
| 11,194,638 B1 | 12/2021 | Danilov et al. |
| 11,314,779 B1 | 4/2022 | Jain |
| 11,354,054 B2 | 6/2022 | Danilov et al. |
| 2004/0199524 A1 | 10/2004 | Rys et al. |
| 2005/0025152 A1 | 2/2005 | Georgiou et al. |
| 2005/0055519 A1 | 3/2005 | Stuart et al. |
| 2006/0036568 A1 | 2/2006 | Moore et al. |
| 2006/0058987 A1 | 3/2006 | Kumar et al. |
| 2007/0033325 A1 | 2/2007 | Sinclair et al. |
| 2007/0047635 A1 | 3/2007 | Stojanovic et al. |
| 2007/0220518 A1 | 9/2007 | Verbowski et al. |
| 2008/0037549 A1 | 2/2008 | Haardt et al. |
| 2008/0059724 A1 | 3/2008 | Stifter |
| 2008/0082596 A1 | 4/2008 | Gorobets |
| 2008/0144079 A1 | 6/2008 | Pandey et al. |
| 2008/0184262 A1 | 7/2008 | Ginis et al. |
| 2008/0189477 A1 | 8/2008 | Asano et al. |
| 2008/0288713 A1 | 11/2008 | Lee et al. |
| 2008/0301135 A1 | 12/2008 | Alves et al. |
| 2009/0182784 A1 | 7/2009 | Rohit et al. |
| 2010/0083098 A1 | 4/2010 | Leme et al. |
| 2010/0088296 A1 | 4/2010 | Periyagaram et al. |
| 2010/0077013 A1 | 5/2010 | Clements et al. |
| 2010/0125553 A1 | 5/2010 | Huang et al. |
| 2010/0125794 A1 | 5/2010 | Hampton et al. |
| 2010/0174881 A1 | 7/2010 | Anglin et al. |
| 2010/0205163 A1 | 8/2010 | Eshghi et al. |
| 2010/0281081 A1 | 11/2010 | Stager et al. |
| 2010/0333116 A1 | 12/2010 | Prahlad et al. |
| 2011/0126099 A1 | 5/2011 | Anderson et al. |
| 2011/0131588 A1 | 6/2011 | Allam et al. |
| 2011/0145473 A1 | 6/2011 | Maheshwari |
| 2011/0161784 A1 | 6/2011 | Selinger et al. |
| 2011/0249147 A1* | 10/2011 | Ishii ................... H04N 21/4223 |
| | | 348/E5.031 |
| 2012/0102503 A1 | 4/2012 | Meijer et al. |
| 2012/0109985 A1 | 5/2012 | Chandrasekaran |
| 2012/0151014 A1 | 6/2012 | Gokhale et al. |
| 2012/0198027 A1 | 8/2012 | Hetzler et al. |
| 2012/0259994 A1 | 10/2012 | Gillies et al. |
| 2013/0226931 A1 | 8/2013 | Hazel et al. |
| 2013/0275808 A1 | 10/2013 | McNeeney et al. |
| 2013/0290598 A1 | 10/2013 | Fiske et al. |
| 2014/0006465 A1 | 1/2014 | Davis et al. |
| 2014/0089264 A1 | 3/2014 | Talagala et al. |
| 2014/0223115 A1 | 8/2014 | Dinkjian et al. |
| 2014/0270343 A1 | 9/2014 | Sanaullah et al. |
| 2014/0325148 A1 | 10/2014 | Choi et al. |
| 2014/0365719 A1 | 12/2014 | Kuzmin et al. |
| 2015/0169449 A1 | 6/2015 | Barrell et al. |
| 2015/0172120 A1 | 6/2015 | Dwarampudi et al. |
| 2015/0205816 A1 | 7/2015 | Periyagaram et al. |
| 2015/0227602 A1 | 8/2015 | Ramu et al. |
| 2015/0261776 A1 | 9/2015 | Attarde et al. |
| 2015/0341212 A1 | 11/2015 | Hsiao et al. |
| 2015/0355862 A1 | 12/2015 | Hayes et al. |
| 2015/0363245 A1 | 12/2015 | Mutschler |
| 2016/0042008 A1 | 2/2016 | Tripathy et al. |
| 2016/0063080 A1 | 3/2016 | Nano et al. |
| 2016/0210061 A1* | 7/2016 | Soncodi ................ G06F 3/0605 |
| 2016/0246713 A1 | 8/2016 | Choi et al. |
| 2016/0321287 A1 | 11/2016 | Luthra et al. |
| 2016/0337435 A1 | 11/2016 | Nigam et al. |
| 2016/0350324 A1 | 12/2016 | Wang et al. |
| 2016/0357476 A1 | 12/2016 | Chen et al. |
| 2017/0038978 A1 | 2/2017 | Li et al. |
| 2017/0075832 A1 | 3/2017 | Bhimani et al. |
| 2017/0075947 A1 | 3/2017 | Kurilov et al. |
| 2017/0091570 A1 | 3/2017 | Rao et al. |
| 2017/0123655 A1 | 5/2017 | Sinclair et al. |
| 2017/0147494 A1 | 5/2017 | Andre et al. |
| 2017/0177249 A1 | 6/2017 | Kurilov et al. |
| 2017/0177263 A1 | 6/2017 | Das et al. |
| 2017/0177546 A1 | 6/2017 | Heinz et al. |
| 2017/0212891 A1 | 7/2017 | Pundir et al. |
| 2017/0213127 A1 | 7/2017 | Duncan |
| 2017/0255392 A1 | 9/2017 | Nakashima |
| 2017/0289214 A1 | 10/2017 | Cho et al. |
| 2017/0374147 A1 | 12/2017 | McNair et al. |
| 2018/0101842 A1 | 4/2018 | Ventura et al. |
| 2018/0121307 A1 | 5/2018 | Braun et al. |
| 2018/0146018 A1 | 5/2018 | Chang et al. |
| 2018/0176244 A1 | 6/2018 | Gervais et al. |
| 2018/0184138 A1 | 6/2018 | Shaw et al. |
| 2018/0189175 A1 | 6/2018 | Ji et al. |
| 2018/0314727 A1 | 11/2018 | Epstein et al. |
| 2018/0329644 A1 | 11/2018 | Das et al. |
| 2018/0332325 A1 | 11/2018 | Kaitchuck |
| 2018/0332365 A1 | 11/2018 | Kaitchuck et al. |
| 2018/0332366 A1 | 11/2018 | Paduroiu |
| 2018/0332367 A1 | 11/2018 | Kaitchuck et al. |
| 2018/0336256 A1 | 11/2018 | Li et al. |
| 2018/0345140 A1 | 12/2018 | Posin |

(56) References Cited

U.S. PATENT DOCUMENTS

| | | | |
|---|---|---|---|
| 2019/0004863 | A1 | 1/2019 | Mainali et al. |
| 2019/0026301 | A1 | 1/2019 | Wang et al. |
| 2019/0046037 | A1 | 2/2019 | Ramesh et al. |
| 2019/0057138 | A1 | 2/2019 | Knowles et al. |
| 2019/0065246 | A1 | 2/2019 | Senapaty et al. |
| 2019/0129806 | A1 | 5/2019 | Hsu et al. |
| 2019/0138494 | A1 | 5/2019 | Inoue |
| 2019/0197173 | A1 | 6/2019 | Tahara et al. |
| 2019/0220671 | A1 | 7/2019 | Slipenchuk |
| 2019/0278849 | A1 | 9/2019 | Chandramouli et al. |
| 2019/0327297 | A1 | 10/2019 | Madani |
| 2019/0332318 | A1 | 10/2019 | Gooding et al. |
| 2019/0340180 | A1 | 11/2019 | Barsness et al. |
| 2019/0349422 | A1 | 11/2019 | Dhruvakumar et al. |
| 2019/0392866 | A1 | 12/2019 | Yoon et al. |
| 2020/0034468 | A1 | 1/2020 | Lei et al. |
| 2020/0089420 | A1 | 3/2020 | Sharoni et al. |
| 2020/0174695 | A1 | 6/2020 | Bazarsky et al. |
| 2020/0250172 | A1 | 8/2020 | Busjaeger et al. |
| 2020/0310686 | A1 | 10/2020 | Truong et al. |
| 2020/0320005 | A1 | 10/2020 | Shulman et al. |
| 2020/0344299 | A1 | 10/2020 | Sohail et al. |
| 2020/0394196 | A1 | 12/2020 | Shivanna et al. |
| 2020/0404011 | A1 | 12/2020 | Gervais et al. |
| 2021/0084318 | A1 | 3/2021 | Kuo et al. |
| 2021/0110328 | A1 | 4/2021 | Isiao et al. |
| 2021/0124746 | A1 | 4/2021 | Klaedtke |
| 2021/0157520 | A1 | 5/2021 | Bavishi et al. |
| 2021/0256029 | A1 | 8/2021 | Danilov et al. |
| 2021/0342296 | A1 | 11/2021 | Danilov et al. |
| 2021/0342354 | A1 | 11/2021 | Danilov et al. |
| 2021/0365211 | A1 | 11/2021 | Danilov et al. |
| 2021/0374021 | A1 | 12/2021 | Santhakumar et al. |
| 2022/0035533 | A1 | 2/2022 | Danilov et al. |
| 2022/0182724 | A1 | 6/2022 | Gupta et al. |
| 2022/0248090 | A1 | 8/2022 | Dhiman et al. |
| 2022/0326878 | A1 | 10/2022 | Paduroiu |

FOREIGN PATENT DOCUMENTS

| | | |
|---|---|---|
| CN | 104901958 B | 9/2015 |
| CN | 105591926 B | 5/2016 |
| GB | 2377038 A | 12/2002 |
| IN | 1708029 A | 12/2005 |
| WO | 2002101585 A2 | 12/2002 |
| WO | 2004080067 A1 | 9/2004 |
| WO | 2009014993 A2 | 1/2009 |
| WO | 2015191120 A1 | 12/2015 |
| WO | 2015196281 A1 | 12/2015 |
| WO | 2018148149 A1 | 8/2018 |

OTHER PUBLICATIONS

Notice of Allowance dated Nov. 23, 2022 for U.S. Appl. No. 17/408,344, 35 pages.
Notice of Allowance dated Nov. 17, 2022 for U.S. Appl. No. 16/944,094, 23 pages.
Office Action dated Feb. 10, 2023 for U.S. Appl. No. 17/145,588, 78 pages.
Non Final Office Action received for U.S. Appl. No. 17/976,574 dated Mar. 2, 2023, 55 pages.
Notice of Allowance received for U.S. Appl. No. 17/337,940 dated Mar. 1, 2023, 70 pages.
Notice of Allowance received for U.S. Appl. No. 17/223,263, dated Apr. 6, 2023, 32 pages.
Final Office Action received for U.S. Appl. No. 17/152,558, dated May 12, 2023, 51 pages.
Non-Final Office Action received for U.S. Appl. No. 17/503,024, dated Jun. 23, 2023, 87 pages.
Non-Final Office Action received for U.S. Appl. No. 16/881,556 dated Jun. 29, 2021, 24 pages.
Akidau et al., "MillWheel: Fault-Tolerant Stream Processing at Internet Scale" Proceedings of the VLDB Endowment, vol. 6, No. 11, 2013, 12 pages.
Akidau et al., "The Dataflow Model: A Practical Approach to Balancing Correctness, Latency, and Cost in Massive- Scale, Unbounded, Out-of-Order Data Processing" Proceedings of the VLDB Endowment, vol. 8, No. 12, 2015, 12 pages.
Execution Model [https://beam.apache.org/documentation/runtime/model/]. The Apache Software Foundation. Retrieved Aug. 26, 2020, 5 pages.
Apache Beam Programming Guide [https://beam.apache.org/documentation/programming-guide/]. The Apache Software Foundation. Retrieved Aug. 26, 2020, 69 pages.
What is Apache Flink?—Applications [https://flink.apache.org/flink-applications.html#building-blocks-for-streaming-applications]. The Apache Software Foundation. Copyright 2014-2019, retrieved Aug. 26, 2020, 7 pages.
What is Apache Flink?—Architecture [https://flink.apache.org/flink-architecture.html]. The Apache Software Foundation. Copyright 2014-2019, retrieved Aug. 26, 2020, 3 pages.
Stateful Function—Event-driven Application on Apache Flink [https://flink.apache.org/stateful-functions.html]. The Apache Software Foundation. Copyright 2014-2019, retrieved Aug. 26, 2020, 8 pages.
What is Apache Flink?—Operations [https://flink.apache.org/flink-operations.html]. The Apache Software Foundation. Copyright 2014-2019, retrieved Aug. 26, 2020, 3 pages.
Use Cases [https://flink.apache.org/usecases.html]. The Apache Software Foundation. Copyright 2014-2019, retrieved Aug. 26, 2020, 5 pages.
Introduction [http://kafka.apache.org/intro]. The Apache Software Foundation. Copyright 2017, retrieved Aug. 26, 2020, 6 pages.
Apache Kafka Quickstart [http://kafka.apache.org/quickstart]. The Apache Software Foundation. Copyright 2017, retrieved Aug. 26, 2020, 6 pages.
Use Cases [http://kafka.apache.org/uses]. The Apache Software Foundation. Retrieved Aug. 26, 2020, 3 pages.
Architecture Overview [pulsar.apache.org/docs/en/concepts-architecture-overview/]. The Apache Software Foundation. Copyright 2020, retrieved Aug. 26, 2020, 11 pages.
Messaging [pulsar.apache.org/docs/en/concepts-messaging/]. The Apache Software Foundation. Copyright 2020, retrieved Aug. 26, 2020, 32 pages.
Pulsar Overview [pulsar.apache.org/docs/en/concepts-overview/]. The Apache Software Foundation. Copyright 2020, retrieved Aug. 26, 2020, 2 pages.
Non-Final Office Action received for U.S. Appl. No. 16/256,083, dated Jan. 29, 2021, 42 pages.
Notice of Allowance received for U.S. Appl. No. 16/884,647, dated Jun. 28, 2021, 39 pages.
Notice of Allowance received for U.S. Appl. No. 17/200,652, dated Jun. 28, 2021, 51 pages.
Non-Final Office Action received for U.S. Appl. No. 17/127,724, dated Oct. 1, 2021, 41 pages.
Notice of Allowance received for U.S. Appl. No. 17/064,747, dated Dec. 15, 2021, 61 pages.
Non-Final Office Action received for U.S. Appl. No. 16/944,089, dated Nov. 10, 2021, 257 bages.
Kleppmann, Martin. "Making Sense of Stream Processing—The Philosophy Behind Apache Kafka and Scalable Stream Data Platforms"; Mar. 4, 2016; retrieved from [https://hashingit.com/elements/research-resources/2016-03-04-making-sense-of-stream-processing.pdf] on Nov. 5, 2021, (Year: 2016), 183 pages.
Notice of Allowance received for U.S. Appl. No. 16/915,762, dated Feb. 4 2022, 57 pages.
Non-Final Office Action received for U.S. Appl. No. 16/915,762, dated Oct. 1, 2021, 57 pages.
Non-Final Office Action received for U.S. Appl. No. 16/864,892, dated Jan. 21, 2022, 26 pages.
Notice of Allowance received for U.S. Appl. No. 17/038,079, dated Feb. 24 2022, 143 pages.
Azhar et al., "Efficient selection of access control systems through multi criteria analytical hierarchy process", IEEE, doi: 10.1109/ICET.2012.6375419, 2012, pp. 1-8. (Year: 2012).

(56) References Cited

OTHER PUBLICATIONS

Rox et al., "Construction and Deconstruction of Hierarchical Event Streams with Multiple Hierarchical Layers", IEEE, doi: 10.1109/ECRTS.2008.13, 2008, pp. 201-210. (Year: 2008).

Notice of Allowance received for U.S. Appl. No. 17/083, 145, dated Feb. 18 2022, 253 pages.

Non-Final Office Action received for U.S. Appl. No. 16/864,905, dated Mar. 21, 2022, 441 pages.

Edi Muskardin et al., "Implementation of Hashing Algorithms in Stream Mining", International Conference on Smart Systems and Technologies (SST), Oct. 2018 , pp. 233-238.

Notice of Allowance dated Apr. 11, 2022 for U.S. Appl. No. 16/944,089, 87 pages.

J. C. Lee, J. Vance and R. Lysecky, "Hardware-Based Event Stream Ordering for System-Level Observation Framework," in IEEE Embedded Systems Letters, vol. 6, No. 4, pp. 81-84, Dec. 2014, doi: 10.1109/LES.2014.2359154. (Year: 2014).

T. Onishi, J. Michaelis and Y. Kanemasa, "Recovery-Conscious Adaptive Watermark Generation for Time-Order Event Stream Processing," 2020 IEEE/ACM Fifth International Conference on Internet-of-Things Design and Implementation (IoTDI), 2020, pp. 66-78, doi: 10.1109/IoTDI49375.2020.00014. (Year: 2020).

Aloysius K. Mok, Honguk Woo and Chan-Gun Lee, "Probabilistic Timing Join over Uncertain Event Streams," 12th EEE International Conference on Embedded and Real-Time Computing Systems and Applications (RTCSA'06), 2006, pp. 17-26, doi: 10.1109/RTCSA.2006.52. (Year: 2006).

M. Liu, M. Li, D. Golovnya, E. A. Rundensteiner and K. Claypool, "Sequence Pattern Query Processing over Out-of-Order Event Streams," 2009 IEEE 25th International Conference on Data Engineering, 2009, pp. 784-795, doi: 10.1109/ICDE.2009.95. (Year: 2009).

Non-Final Office Action received for U.S. Appl. No. 16/944,094, dated Apr. 20, 2022, 48 pages.

Non-Final Office Action received for U.S. Appl. No. 17/038,102, dated Apr. 12, 2022, 52 pages.

Notice of Allowance received for U.S. Appl. No. 17/127,724, dated Apr. 27, 2022, 19 pages.

Non-Final Office Action received for U.S. Appl. No. 17/237,535, dated May 24, 2022, 62 pages.

Final Office Action received for U.S. Appl. No. 16/864,892, dated Jul. 8, 2022, 33 pages.

Final Office Action received for U.S. Appl. No. 16/864,905, dated Jul. 15, 2022, 77 pages.

Final Office Action received for U.S. Appl. No. 16/944,094, dated Sep. 1, 2022, 25 pages.

Non-Final Office Action received for U.S. Appl. No. 17/070,029, dated Jul. 21, 2022, 68 pages.

Notice of Allowance received for U.S. Appl. No. 17/152,544, dated Aug. 24, 2022, 55 pages.

Non-Final Office Action received for U.S. Appl. No. 17/383,425, dated Sep. 15, 2022, 88 pages.

Phaujdar, "Understanding Event Streams—A Comprehensive Guide 101_ Learn Hevo" [https://hevodata.com/learn/understanding-event-streams/] (Feb. 17, 2021) (Year: 2021).

Dhanushka, "Understanding Kafka Topic Partitions" [https://medium.com/event-driven-utopia/understanding-kafka-topic-partitions-ae40f80552e8]—(Mar. 28, 2021) (Year: 2021).

Splunk, "Comparing Pulsar and Kafka" [https://www.splunk.com/en_us/blog/it/comparing-pulsar-and-kafka-how-a-segment-based-architecture-delivers-better-performance-scalability-and-resilience.html]—(Dec. 5, 2017) (Year: 2017).

Notice of Allowance received for U.S. Appl. No. 17/145,588, dated Aug. 7, 2023, 28 pages.

Notice of Allowance received for U.S. Appl. No. 17/976,574, dated Jul. 6, 2023, 41 pages.

Non-Final office action received for U.S. Appl. No. 17/152,558 dated Oct. 19, 2023, 66 pages.

Non-Final office action received for U.S. Appl. No. 17/228,611 dated Dec. 11, 2023, 70 pages.

Non-Final office action received for U.S. Appl. No. 17/237,517 dated Nov. 27, 2023, 117 pages.

Final office action received for U.S. Appl. No. 17/503,024 dated Dec. 1, 2023, 98 pages.

Notice of Allowance received for U.S. Appl. No. 17/145,588, dated Oct. 18, 2023, 6 pages.

Non-Final Office Action received for U.S. Appl. No. 17/408,344, dated Sep. 30, 2022, 66 pages.

Non-Final Office Action received for U.S. Appl. No. 17/063,906, dated Oct. 27, 2022, 59 pages.

Notice of Allowance received for U.S. Appl. No. 16/864,905, dated Nov. 30, 2022, 347 pages.

Tony Tung et al., "Topology Dictionary for 3D Video Understanding", IEEE Transactions on Pattern Analysis and Machine Intelligence ( vol. 34, Issue: 8, Aug. 2012), Dec. 2011, pp. 1645-1657.

A. Bulut et al., "Distributed data streams indexing using content-based routing paradigm", 19th IEEE International Parallel and Distributed Processing Symposium, Apr. 2005, pp. 1-10.

Notice of Allowance received for U.S. Appl. No. 17/070,029, dated Dec. 2, 2022, 36 pages.

Non-Final Office Action received for U.S. Appl. No. 17/223,263, dated Nov. 28, 2022, 64 bages.

Non-Final Office Action received for U.S. Appl. No. 17/152,558, dated Dec. 7, 2022, 59 pages.

Non-Final Office Action received for U.S. Appl. No. 17/337,940, dated Dec. 30, 2022, 68 pages.

Notice of Allowance received for U.S. Appl. No. 17/063,906, dated Feb. 6, 2023, 29 pages.

Notice of Allowance received for U.S. Appl. No. 17/383,425, dated Feb. 1, 2023, 37 pages.

Notice of Allowance for U.S. Appl. No. 17/237,517 dated Feb. 28, 2024.

Notice of Allowance for U.S. Appl. No. 17/503,024 dated Feb. 23, 2024.

\* cited by examiner

RETENTION MANAGEMENT FOR DATA STREAMS

RELATED APPLICATION

The subject patent application is a divisional of, and claims priority to, U.S. patent application Ser. No. 16/864,892, filed May 1, 2020, and entitled "Retention Management for DATA Streams," the entirety of which priority application is hereby incorporated by reference herein.

TECHNICAL FIELD

The subject application relates generally to data storage, and, for example, to a technology that manages retention policy in storage systems that implement data streams for storing and serving continuous and unbounded data, and related embodiments.

BACKGROUND

Contemporary data storage systems, such as DELL EMC's PRAVEGA system/data storage service, store data in a storage abstraction referred to as a stream. A stream is identified with a name, and can store continuous and potentially unbounded data; more particularly, a stream comprises a durable, elastic, append-only, sequence of stored events. One stream may be divided into one or more segments, such as based on the routing keys associated with the events. Older stream data can be aggregated into chunks and written to an object storage system (e.g., Dell EMC's ECS data storage system) or to a file storage system (e.g., DELL EMC's ISILON data storage system).

New events are added to a tail (front) of a stream. As can be readily appreciated, PRAVEGA is thus ideal for IoT (Internet of Things) data, where devices/sensors may generate thousands of data points per second. Notwithstanding, PRAVEGA may be highly beneficial for storing data corresponding to more traditional workloads, such as financial trading data that regularly changes.

Although a stream is potentially unbounded, storage resources are finite. PRAVEGA provides ways to cut a stream short, including an automatic data expiration feature and an explicit truncate call. When cut, the events are deleted from a head (back) of a stream. Not all stream data can simply be truncated, however, as data retention policies need to be followed for some types of data, typically for regulatory compliance or business reasons.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
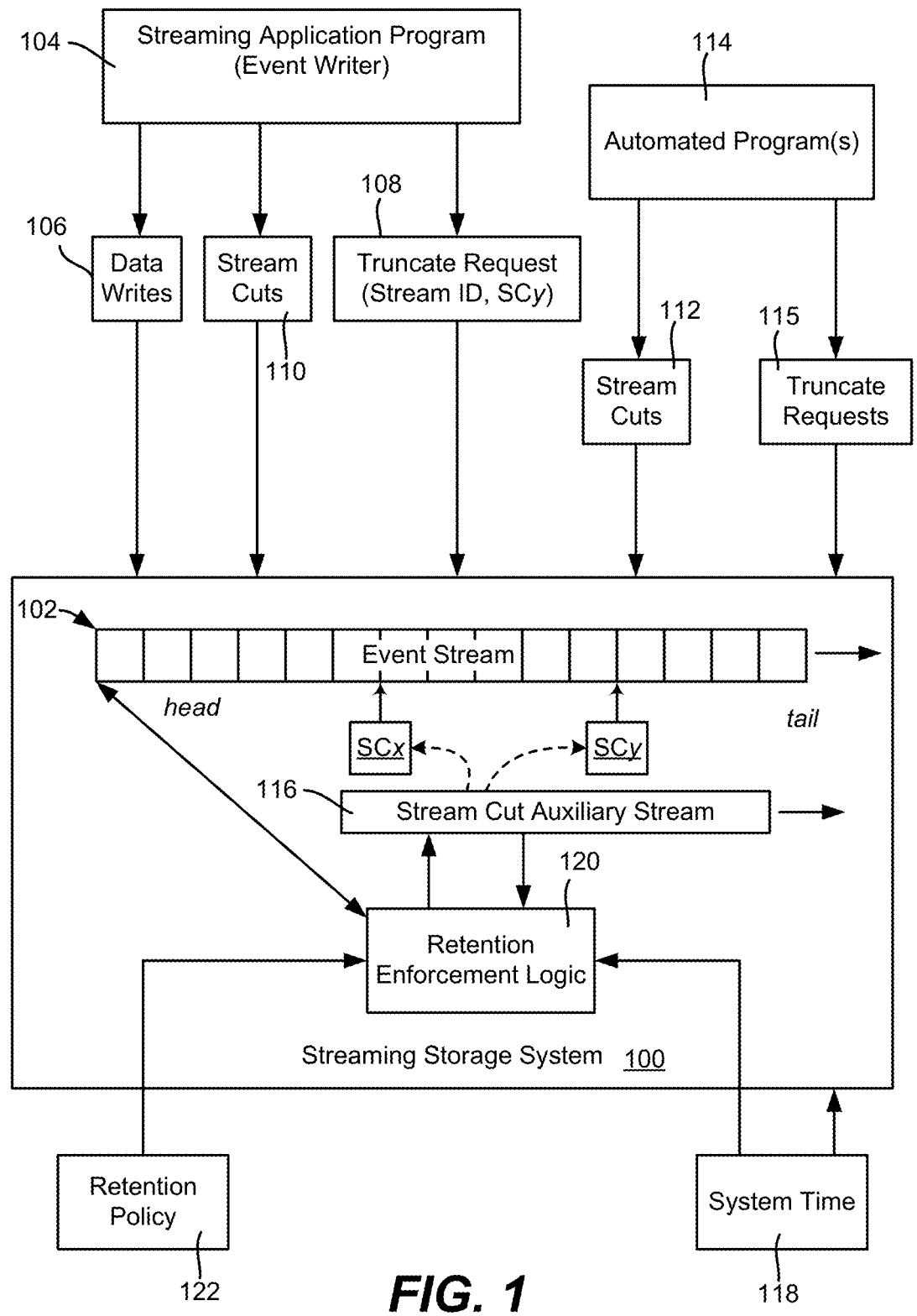
FIG. 1 is a block diagram representation of example components and data—related operations in a streaming data storage system subject to data retention policy, in accordance with various aspects and implementations of the subject disclosure

Various aspects of the technology described herein are generally directed towards implementing data retention management in stream-based data storage systems. In one aspect, a retention policy (that is, corresponding to a retention period) is specified for individual streams, or possibly multiple streams. For multiple streams, a retention policy can be specified at higher levels, e.g., the system level or a scope (namespace) level, with the retention policy is propagated to the streams within the system or the scope.

In general, as described herein retention management logic blocks attempts to delete any data that is under retention from a stream. Deletion of data, which can be considered truncation of the stream's older data (events), is allowed by the retention management logic when the data to be deleted is not under a retention policy and/or no longer within the retention period associated with the stream.

It should be understood that any of the examples herein are non-limiting. For instance, some of the examples are based on PRAVEGA data storage technology; however virtually any stream-based data storage system may benefit from the technology described herein. As a more particular example, instead of tracking time for each event written in PRAVEGA, a "stream cut object" or simply a "stream cut" refers to a specific position in the data stream that is generated by a data writer; older data needs to be deleted from a stream cut boundary (rather than arbitrarily), unless any of data to be deleted within the retention policy period as described herein. A stream cut is associated with a time value. Other data stream storage systems can use a similar concept, or can use timestamped data; notwithstanding, as will be understood, the technology described herein can be applied to any stream-based data storage mechanism that tracks position/time of stored data. Thus, any of the embodiments, aspects, concepts, structures, functionalities or examples described herein are non-limiting, and the technology may be used in various ways that provide benefits and advantages in computing and data storage in general.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

FIG. 1 shows a streaming data storage system 100 that includes an event stream 102 comprising a data stream of events, with event writes being appended from a head towards a tail direction. Note that for simplicity, FIG. 1 does not illustrate the concept of stream segments, (which are shown herein with reference to FIGS. 2 and 3).

In general, an event writer such as a streaming application program 104 sends data writes (events) 106 to the streaming data storage system 100 for appending to the event stream 102. As described herein, the application program 104 can also send truncate requests 108 to the streaming storage system 100, such as by identifying the stream for which truncation is requested, and specifying a particular stream cut.

More particularly, as set forth above, a position in a stream at an event boundary is specified using a stream cut. The application program 104 can request association of a stream cut with a stream, as represented by block 110. Instead of, or in addition to, application-specified stream cuts, stream cuts 112 can be created automatically, such as periodically, by automated program(s) 114 or the like. The automated program(s) can also send truncate requests 115, such as when the stream reaches a size capacity limit.

The stream cuts for a stream can be considered a series of stream cuts. In one or more implementations, the stream cuts may be maintained as an auxiliary system stream 116 associated with the main data stream, e.g., event stream 102 in FIG. 1. A time value (obtained from the system time) can be associated with each stream cut, such as corresponding to when a given stream cut object is created. For example, the correct system time (block 118) can be obtained via use of the NTP (Network Time Protocol).

Turning to aspects related to data retention, FIGS. 1 exemplifies retention enforcement logic 120 that enforces retention policy 122, corresponding to a retention time period, associated with the event stream 102. The retention enforcement logic 120 can be incorporated into the streaming storage system 100 as shown in FIG. 1, or otherwise coupled thereto. As set forth herein, a retention policy 122 can be associated with an individual stream, multiple streams within a specified scope, or possibly the entire set of streams of a streaming storage system.

In general, before truncating any data, the retention enforcement logic 120 evaluates whether the truncation request is allowable based on the retention policy 122. For a retention policy 122 that specifies infinite data retention, it is straightforward for the retention management logic 120 to block any request, either a manual or automatic attempt, to truncate the stream.

For a data finite retention period, data retention, which is time-based by its nature, has to have some notion of time at the stream level. When a stream is to be truncated, the position in the stream at an event boundary is specified via a stream cut identified in the request. The events that are ahead of the stream cut (that is, older events), are removed from the stream.

As described herein, each stream cut has an associated time, namely its time of creation in one implementation. When a stream is requested to be truncated, the retention enforcement logic 120 evaluates whether the time of the specified stream cut is within the retention period. If not, the truncation is allowed to occur; otherwise, the retention enforcement logic 120 blocks the request.

Figure 2:
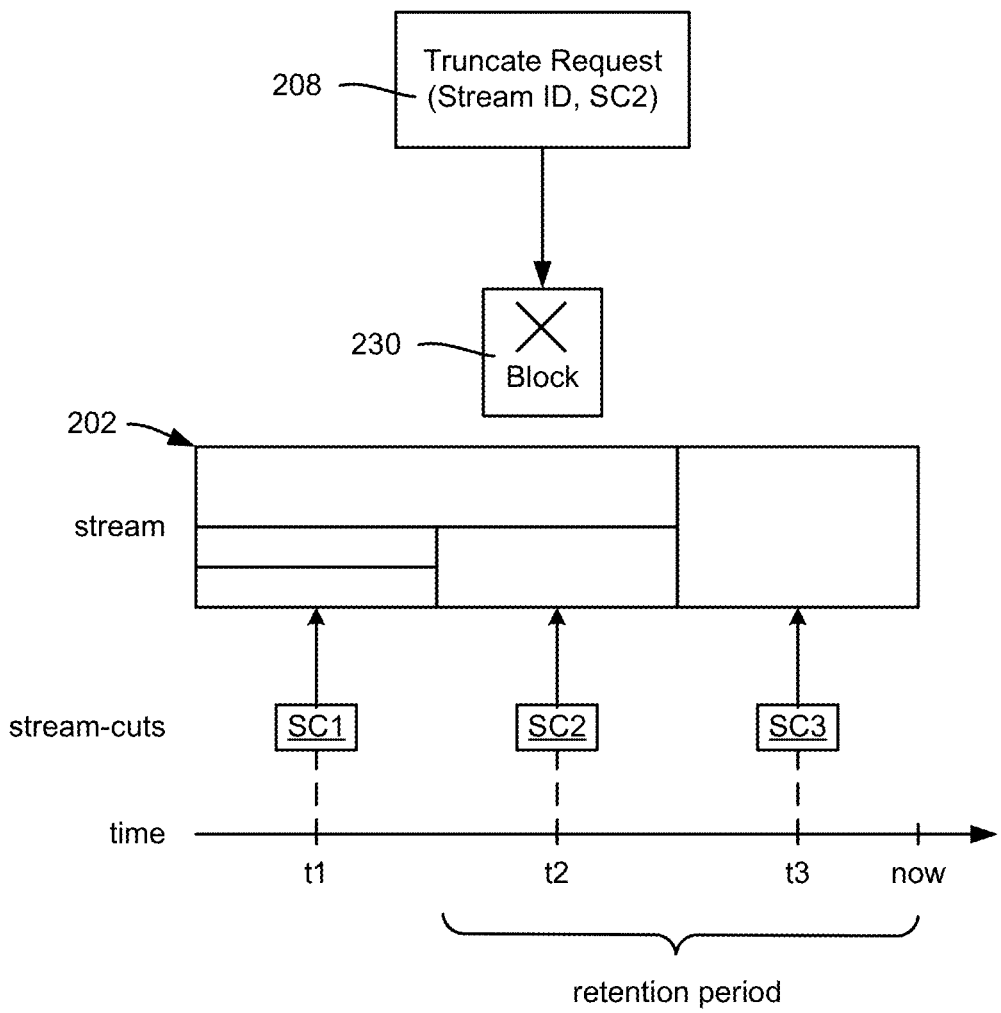
FIGS. 2 and 3 are examples of handling requests to truncate data within a data retention period (FIG. 2) and no longer within the data retention period (FIG. 3), in accordance with various aspects and implementations of the subject disclosure.
Figure 3:
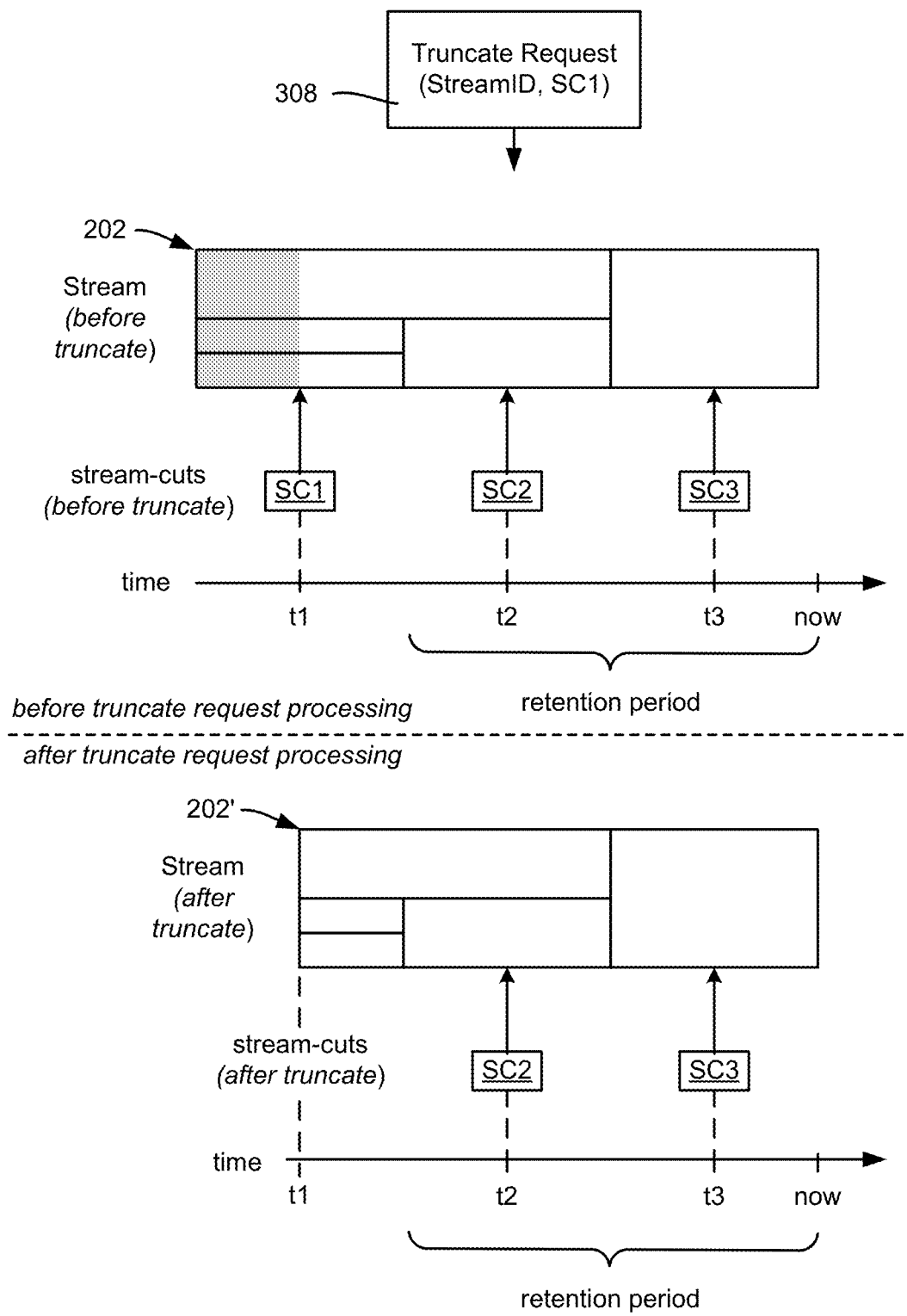

FIGS. 2 and 3 show examples of truncation requests being blocked (FIG. 2) or allowed to proceed (FIG. 3). Note that FIGS. 2 and 3 show a segmented stream of events, in that the segments are represented as separate rectangles that make up the stream 202.

FIGS. 2 and 3 also illustrate the concept of a stream of periodically created stream cuts. The three stream cuts shown are created at times t1, t2, and t3, wherein the times are used as metadata for the stream cuts. A relatively considerable retention period is specified for the stream; as is shown, for the retention period up to the current retention end time of "now", the retention period starts somewhere between times t1 and t2. The stream cannot be truncated using the stream cut Sc2 corresponding to time t2 (or SC3 corresponding to time t3), because doing so would impact (delete) data that is still under retention.

Thus, in FIG. 2 when a truncation request 208 is received, the specified stream cut (SC2) is evaluated to determine whether the specified stream cut (SC2) is within the retention period. Accordingly, as described herein and as shown in FIG. 2, the truncate request 208 is blocked (block 230)

One way to determine whether the time of the specified stream cut is within the retention period is to calculate a retention end time. The retention end time can be calculated as retention_end_time=stream_cut.time+stream.retention_period, that is, the retention end time equals the retention period configured for the stream added to the time associated with the stream cut. The retention end time is then compared to the current system time, and if the retention end time is in the future, stream truncation is blocked, otherwise stream truncation is allowed. Note that the main stream (e.g., the event stream 102) is truncated, the auxiliary stream 116 of stream cuts can be truncated as well, removing from the auxiliary stream the specified stream cut and any stream cut or stream cuts prior to the specified stream cut.

As can be readily appreciated, other calculations can provide the same decision result. For example, the current system time minus the retention period equals a retention start time; then, if the time associated with the specified stream cut time is before the retention start time, truncation is allowed to proceed, otherwise truncation is blocked.

As shown in FIG. 3, however, a truncate request 308 is received that specifies an earlier stream cut, SC1, corresponding to the time t1. As is understood, such as based on one of the above calculations, it is determined that the specified stream cut is not within the retention period. This means that the stream can be truncated from the events prior to time t1/stream cut SC1. As is represented in FIG. 3 by the before and after truncate request processing operations, seen, the data (shown shaded before processing) to the left of time t1/stream cut SC1 is truncated (not shown) after processing. The truncated stream 202' is reduced in size relative to the stream 202. Note that stream cut SC1 including its metadata, and any other earlier stream cuts can be removed from the auxiliary stream unless deemed desirable to keep for another reason, e.g., stream cut SC1 can be used to track a new starting time for the remaining stream 202'.

Turning to another aspect, data retention can operate with size-based data expiration, such as supported in PRAVEGA. With size-based data expiration, an administrator can specify a maximal size for a stream data in the terms of capacity. In general, size-based data expiration automatically cuts the stream short to make the data stream's capacity footprint stay within the limit.

However, when there is also a retention period defined for the stream, the size-based expiration feature needs to be configured using an assumption about the data ingestion rate, because data within a stream cannot be expired before its retention ends. Note that data expiration is not allowed for data retained in the retention period for compulsory legal/regulatory purposes or the like, and thus retention policy needs to override any size-based data expiration; (in contrast, if data is only retained for a non-compulsory business purpose such as data analytics, a business decision can be made as to whether size-based expiration can override retention policy).

Figure 4:
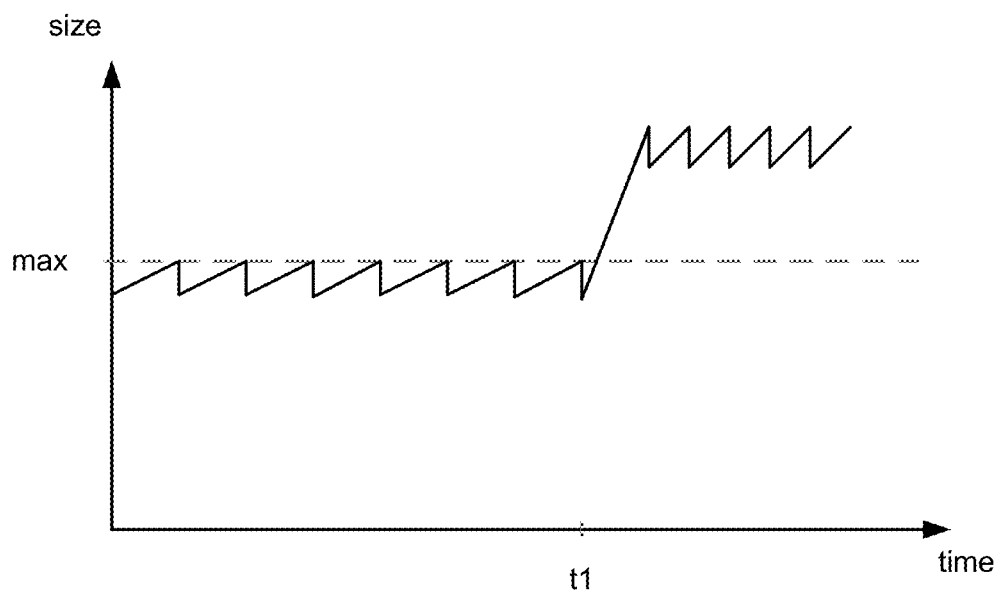
FIG. 4 is a graphical representation of data ingestion to illustrate a potential conflict between automated size-based data expiration and data retention, in accordance with various aspects and implementations of the subject disclosure.

As graphically represented in FIG. 4, the data ingestion rate (size to time) is around the expected 'max" value until time t1. Before this time, whenever it is time to cut the stream short because its size reaches the capacity limit (max), the data to be deleted has reached the end of its retention so it can be deleted. However, after time t1 the data ingestion rate grows above the assumed value. After time t1, when it is desired to cut the stream short because it has reached the capacity limit, at least a part the data to be deleted is still under retention, so it cannot be deleted. The system is forced to make delayed a data expiration. As a result, the stream may have a capacity footprint over the limit, possibly for a long period of time.

Thus, when the data ingestion rate considerably exceeds the assumed "max" value, there can be a conflict between data expiration and data retention. Assuming that in this example data retention takes priority over data expiration, the capacity footprint of the stream may considerably exceed the desired "max" limit. This possibility needs to be considered during storage capacity planning whenever data retention policy has priority over data expiration policy.

Figure 5:
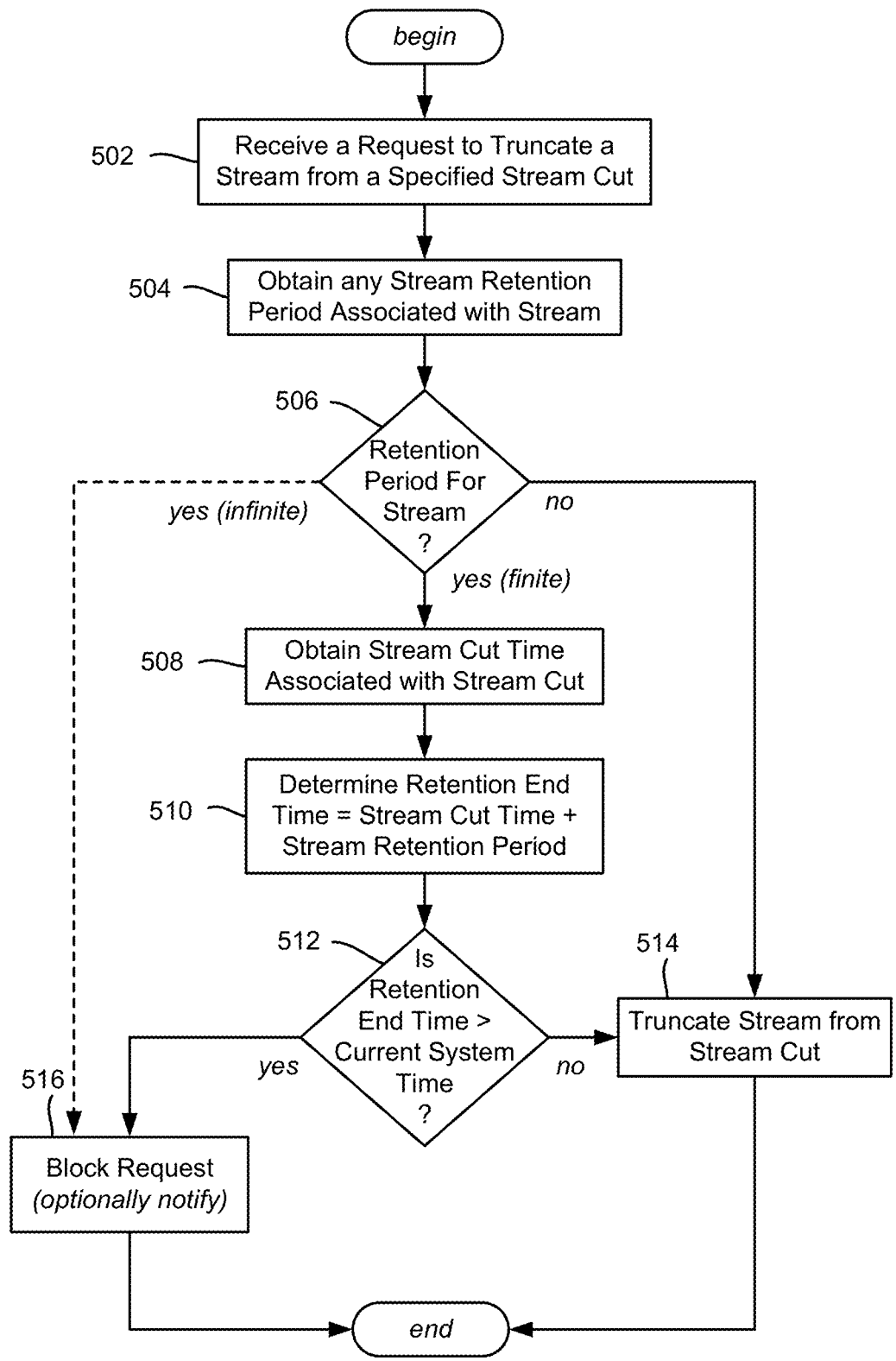
FIG. 5 is a flow diagram showing example operations of data retention enforcement logic, including operations to block truncation requests for a data stream's data that is within a retention period, in accordance with various aspects and implementations of the subject disclosure.

FIG. 5 is a flow diagram showing example operations that may be performed by retention enforcement logic, beginning at operation 502 where a request to truncate a stream (e.g., identified in the request) from a specified stream cut is received. Operation 504 obtains the stream retention period, if any, specified in any associated retention policy for this stream.

At operation 506, if there is no retention period, operation 514 is performed to truncate the stream from the request. Alternatively, if there is an infinite retention period (the branch represented by the dashed line), operation 516 is performed to block the request, possibly notifying the requestor as to why the request was blocked.

As a likely more typical alternative for a retention policy, for a finite retention period, operation 508 is performed to obtain the stream cut time associated with the specified stream cut. Operations 510 and 512 represent determining whether the stream cut time is within the retention period, which in this example use the "Retention End Time" calculation (operation 510) described herein, along with a comparison at operation 512 as to whether the retention end time is greater than the current system time, that is, the retention end time is in the future. If the retention end time is not in the future (the stream cut time is not within the retention period), truncation is allowed to proceed, as represented via operation 514. Otherwise retention is blocked at operation 516.

Note that in addition to blocking at operation 516, an option is for the system to look for an earlier stream cut that is not within the retention period. The requesting entity can be notified of such an earlier stream cut, e.g., a response code can indicate "blocked because requested stream cut Y is in retention period, but truncation is available from an older stream cut X;" this gives the requestor some context for a subsequent truncation decision, instead of having the requesting entity keep trying to truncate from earlier and earlier stream cuts. Another alternative is to automatically truncate from the most recent stream cut (if any) that is no longer within the retention period, and only block if no earlier stream cut is available. The requesting entity can be notified of the truncation from the different stream cut from the stream cut that was requested.

Figure 6:
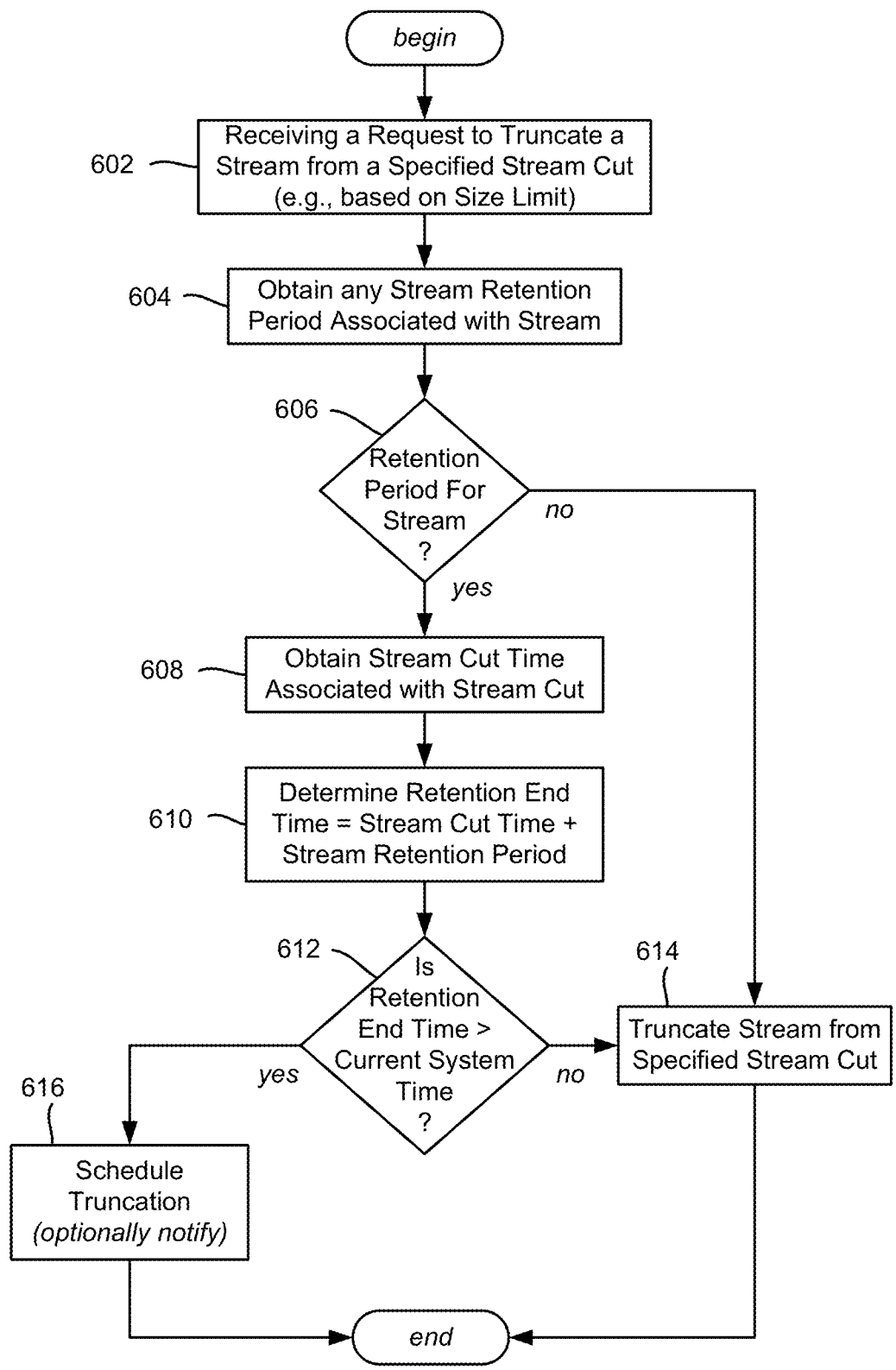
FIG. 6 is a flow diagram showing example operations of data retention enforcement logic, including to prevent truncation of a data stream's data that is within a retention period, while scheduling truncation when the data is no longer within the retention period, in accordance with various aspects and implementations of the subject disclosure.

FIG. 6 shows another alternative, which may be particularly useful with sized-based data expiration (e.g., received via operation 502) or other automated stream truncation. In FIG. 6, most of the operations are similar to those of FIG. 5, and thus are not described again for purposes of brevity. However, operation 616 is different, in that instead of blocking, the requested truncation operation is scheduled, for example for as soon as the stream cut time of the requested stream cut is no longer within the retention period, e.g., based on the retention end time. It is also feasible to automatically cut the stream from the most recent stream cut that is no longer within the retention period, even if not specified. Indeed, a useful call may be made to "truncate based on size-based expiration" that triggers a truncation operation from the most recent stream cut that is no longer within the retention period, as well as schedules a truncation operation to occur from any specified stream cut as soon as that specified stream cut is no longer within the retention period window.

Figure 7:
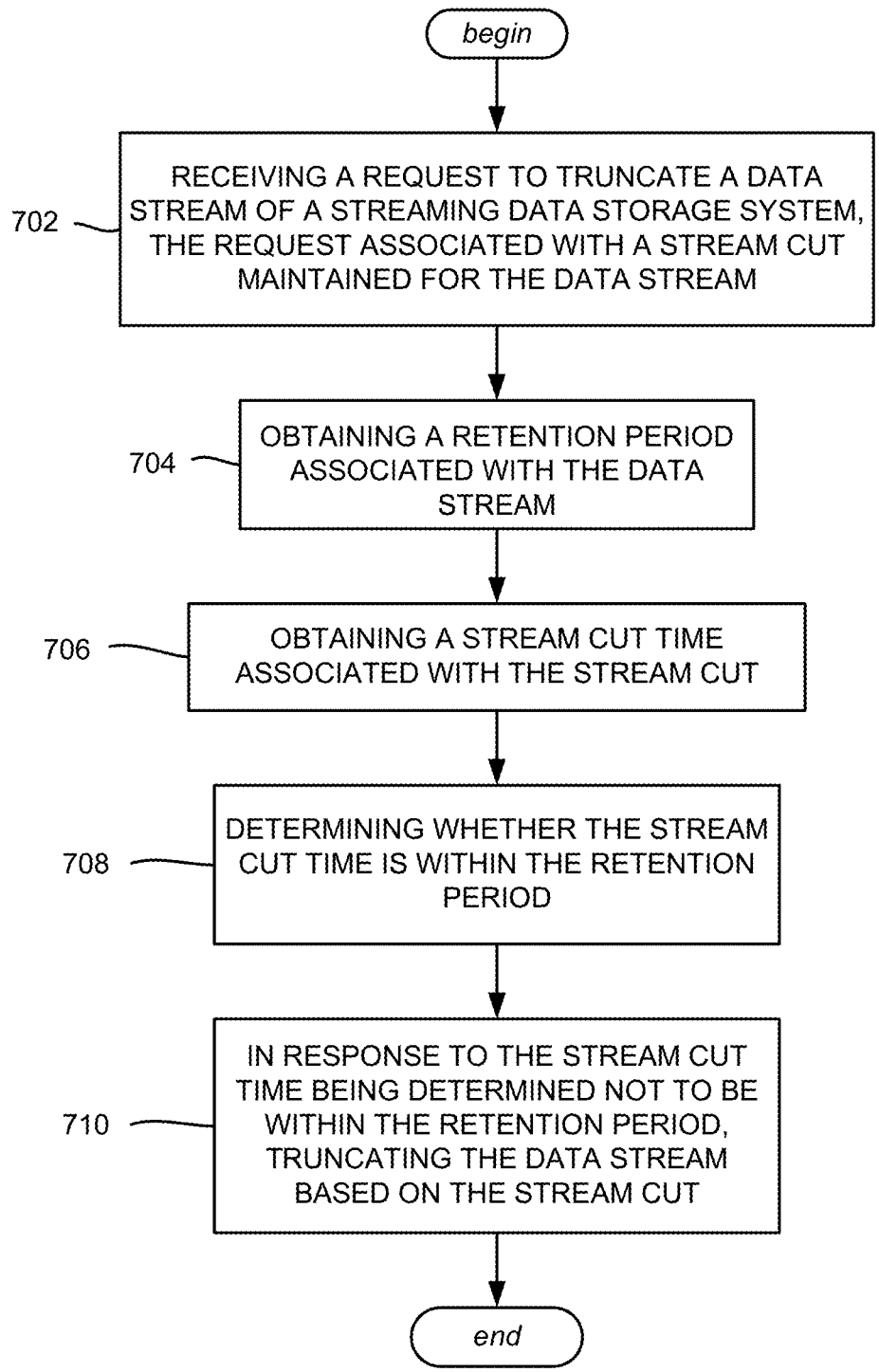
FIG. 7 is a flow diagram showing example operations related to processing a data stream truncation request with respect to a data retention period, in accordance with various aspects and implementations of the subject disclosure.

One or more aspects can be embodied in a system, such as represented in FIG. 7, and for example can comprise a memory that stores computer executable components and/or operations, and a processor that executes computer executable components and/or operations stored in the memory. Example operations can comprise operation 702, which represents receiving a request to truncate a data stream of a streaming data storage system, the request associated with a stream cut maintained for the data stream. Operation 704 represents obtaining a retention period associated with the data stream. Operation 706 represents obtaining a stream cut time associated with the stream cut. Operation 708 represents determining whether the stream cut time is within the retention period. Operation 710 represents, in response to the stream cut time being determined not to be within the retention period, truncating the data stream based on the stream cut.

Determining whether the stream cut time is within the retention period can comprise determining a retention end time based on the stream cut time and the retention period, and determining whether the retention end time is later than a current system time.

Further operations can comprise, in response to the stream cut time being determined to be within the retention period, blocking the request. The request to truncate the data stream can be received from a size-based expiration requestor, and blocking the request can correspond to increasing a capacity footprint of the data stream beyond a pre-specified size limit. Further operations can comprise scheduling a delayed truncation operation in response to the increasing the capacity footprint of the data stream. Scheduling the delayed truncation operation can comprise scheduling the delayed truncation operation to occur at a stream cut time that is not within the retention time period.

The stream cut can be a second stream cut, and the stream cut time value cam be a second stream cut time value that is after a first stream cut time value of a first stream cut earlier in time than the second stream cut, and further operations can comprise, in response to determining that the second stream cut time value is within the retention period, selecting the first stream cut, and determining whether the first stream cut time value is within the retention period, and in response to determining that the first stream cut time is not within the retention period, truncating the data stream based on the first stream cut.

Further operations can comprise maintaining an auxiliary stream comprising stream cut data for the stream cut in association with the data stream. Further operations can comprise in response to the stream cut time being determined not to be within the retention period, truncating the auxiliary stream based on the stream cut.

Figure 8:
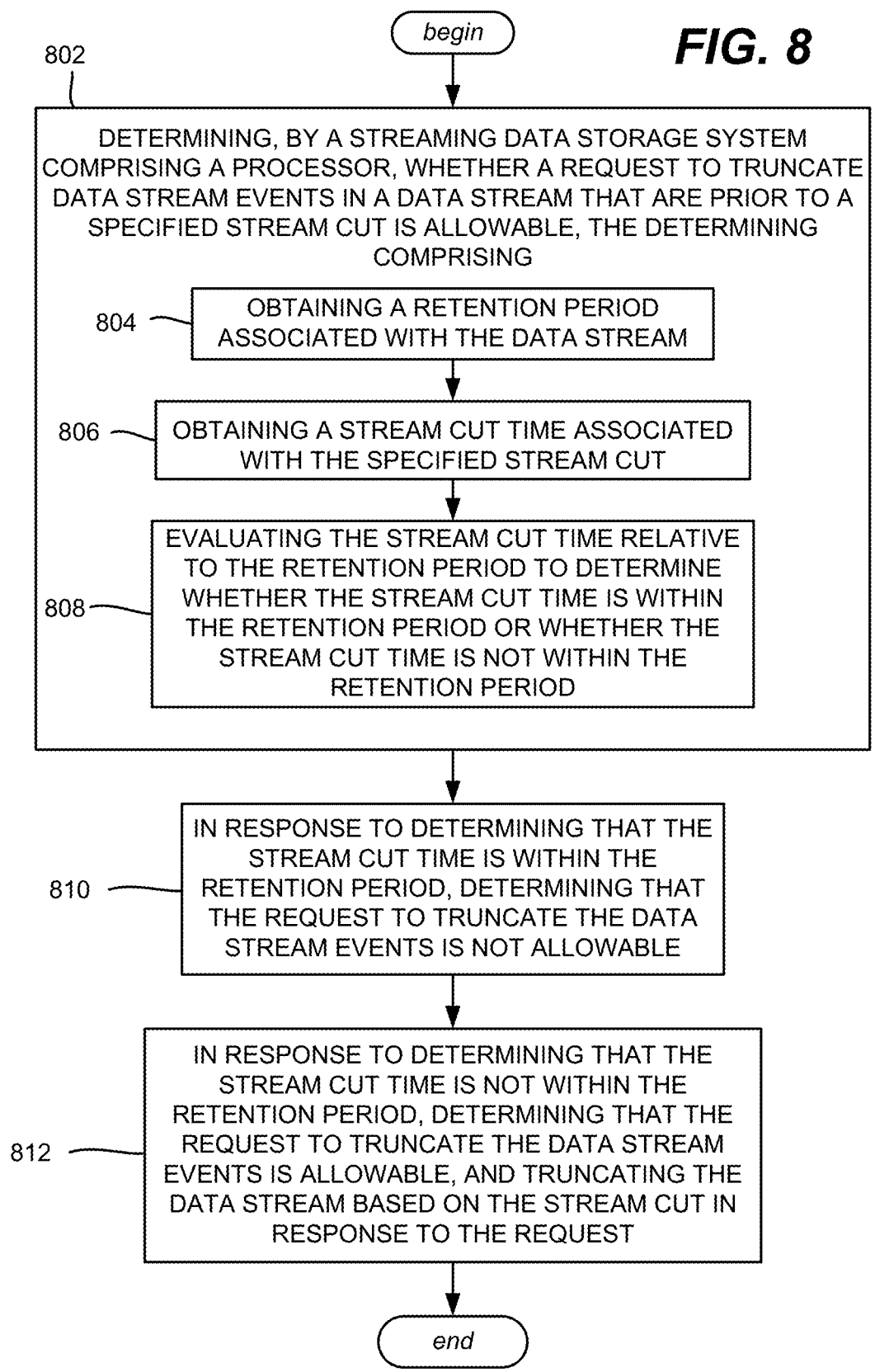
FIG. 8 is an example flow diagram showing example operations related to determining whether a request to truncate a data stream is allowable based on a requested truncation position with respect to a data retention period, in accordance with various aspects and implementations of the subject disclosure, in accordance with various aspects and implementations of the subject disclosure.

One or more example aspects, such as corresponding to example operations of a method, are represented in FIG. 8. Operation 802 represents determining, by a streaming data storage system comprising a processor, whether a request to truncate data stream events in a data stream that are prior to a specified stream cut is allowable; the determining can comprise obtaining a retention period associated with the data stream (operation 804), obtaining a stream cut time associated with the specified stream cut (operation 806), and evaluating the stream cut time relative to the retention period to determine whether the stream cut time is within the retention period or whether the stream cut time is not within the retention period (operation 808). Operation 810 represents, in response to determining that the stream cut time is within the retention period, determining that the request to truncate the data stream events is not allowable. Operation 812 represents, in response to determining that the stream cut time is not within the retention period, determining that the request to truncate the data stream events is allowable, and truncating the data stream based on the stream cut in response to the request.

Aspects can comprise, in response to determining that the request to truncate the data stream events is not allowable, blocking the request.

Aspects can comprise, in response to determining that the request to truncate the data stream events is not allowable, scheduling a future truncation operation based on the specified stream cut.

Evaluating the stream cut time relative to the retention period to determine whether the stream cut time is within the retention period or whether the stream cut time is not within the retention period can comprise determining a retention period end time based on the stream cut time and the retention period, and determining whether the retention end time is later than a current system time.

Evaluating the stream cut time relative to the retention period to determine whether the stream cut time is within the retention period or whether the stream cut time is not within the retention period can comprise determining a retention period start time based on a current system time and the retention period, and determining whether the stream cut time is earlier than the retention period start time.

Aspects can comprise maintaining an auxiliary stream comprising stream cut data for the stream cut in association with the data stream, and, in response to determining that the stream cut time has a stream cut time value that is not within the retention period, truncating the auxiliary stream based on the stream cut.

Figure 9:
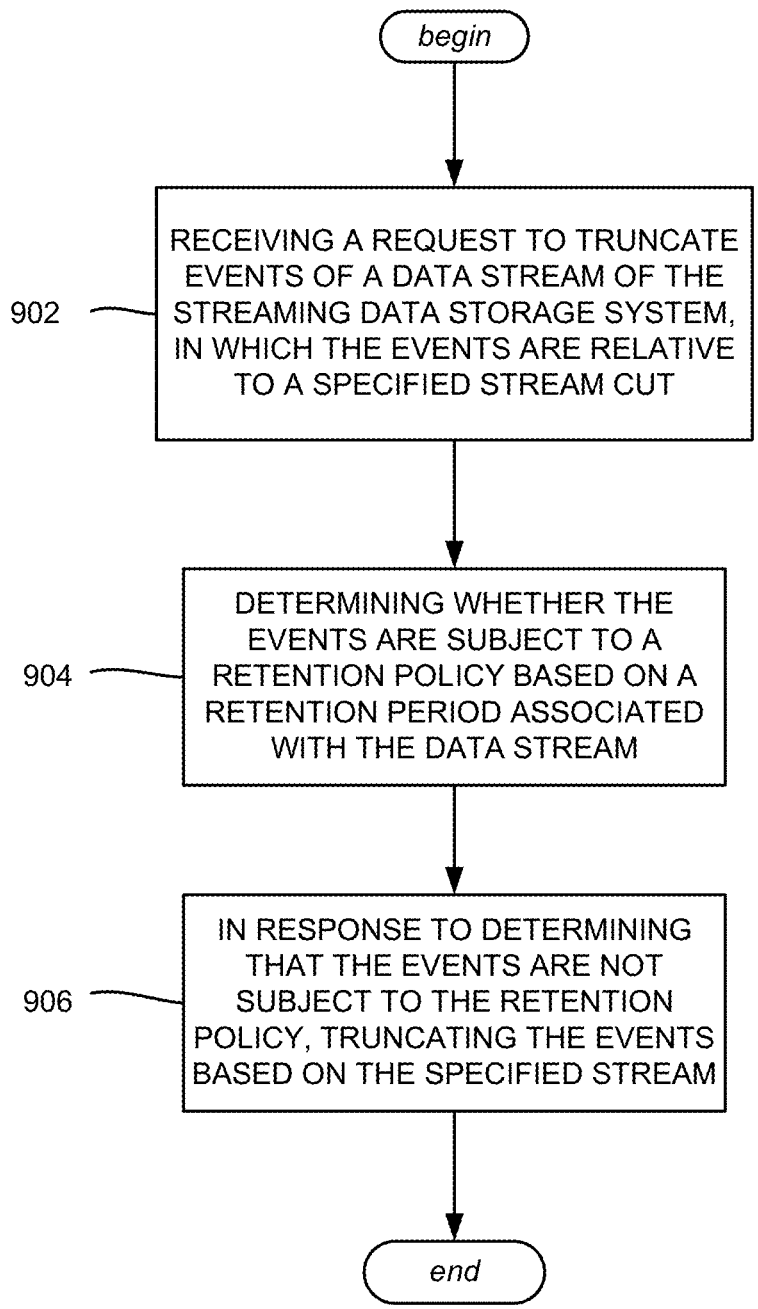
FIG. 9 is an example flow diagram showing example operations related to truncating events in a data stream when the events are not subject to a data retention policy, in accordance with various aspects and implementations of the subject disclosure.

FIG. 9 summarizes various example operations, e.g., corresponding to a machine-readable storage medium, comprising executable instructions that, when executed by a processor of a streaming data storage system, facilitate performance of operations. Operation 902 represents receiving a request to truncate events of a data stream of the streaming data storage system, in which the events are relative to a specified stream cut. Operation 904 represents determining whether the events are subject to a retention policy based on a retention period associated with the data stream Operation 906 represents, in response to determining that the events are not subject to the retention policy, truncating the events based on the specified stream cut.

Determining whether the events are subject to the retention policy can comprise accessing a stream cut time value associated with the specified stream cut, and determining whether the stream cut time value is within the retention period.

Further operations can comprise, in response to determining that the events are subject to the retention policy, blocking the request.

Further operations can comprise, in response to determining that the events are subject to the retention policy, scheduling a future truncation operation based on the specified stream cut.

Further operations can comprise, in response to determining that the events are subject to the retention policy, attempting to locate an earlier stream cut that is prior to the specified stream cut.

As can be seen, described herein is a technology that facilitates data retention management in stream-based data storage systems. The technology provides for compliance with data retention policies, including for enterprises that need to comply with state and federal regulations, as well as other business reasons. The technology is practical to implement.

Figure 10:
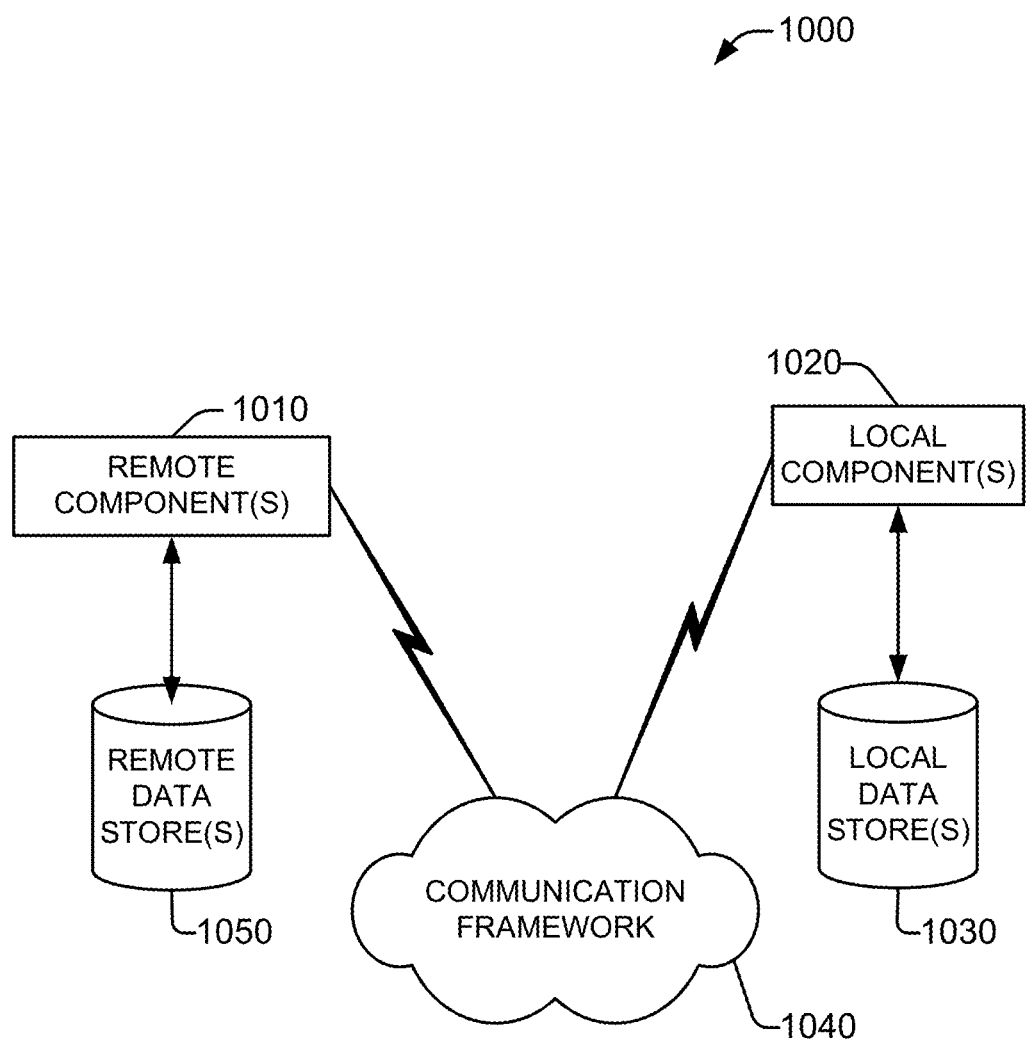
FIG. 10 is a block diagram representing an example computing environment into which aspects of the subject matter described herein may be incorporated.

FIG. 10 is a schematic block diagram of a computing environment 1000 with which the disclosed subject matter can interact. The system 1000 comprises one or more remote component(s) 1010. The remote component(s) 1010 can be hardware and/or software (e.g., threads, processes, computing devices). In some embodiments, remote component(s) 1010 can be a distributed computer system, connected to a local automatic scaling component and/or programs that use the resources of a distributed computer system, via communication framework 1040. Communication framework 1040 can comprise wired network devices, wireless network devices, mobile devices, wearable devices, radio access network devices, gateway devices, femtocell devices, servers, etc.

The system 1000 also comprises one or more local component(s) 1020. The local component(s) 1020 can be hardware and/or software (e.g., threads, processes, computing devices). In some embodiments, local component(s) 1020 can comprise an automatic scaling component and/or programs that communicate/use the remote resources 1010 and 1020, etc., connected to a remotely located distributed computing system via communication framework 1040.

One possible communication between a remote component(s) 1010 and a local component(s) 1020 can be in the form of a data packet adapted to be transmitted between two or more computer processes. Another possible communication between a remote component(s) 1010 and a local component(s) 1020 can be in the form of circuit-switched data adapted to be transmitted between two or more computer processes in radio time slots. The system 1000 comprises a communication framework 1040 that can be employed to facilitate communications between the remote component(s) 1010 and the local component(s) 1020, and can comprise an air interface, e.g., Uu interface of a UMTS network, via a long-term evolution (LTE) network, etc. Remote component(s) 1010 can be operably connected to one or more remote data store(s) 1050, such as a hard drive, solid state drive, SIM card, device memory, etc., that can be employed to store information on the remote component(s) 1010 side of communication framework 1040. Similarly, local component(s) 1020 can be operably connected to one or more local data store(s) 1030, that can be employed to store information on the local component(s) 1020 side of communication framework 1040.

Figure 11:
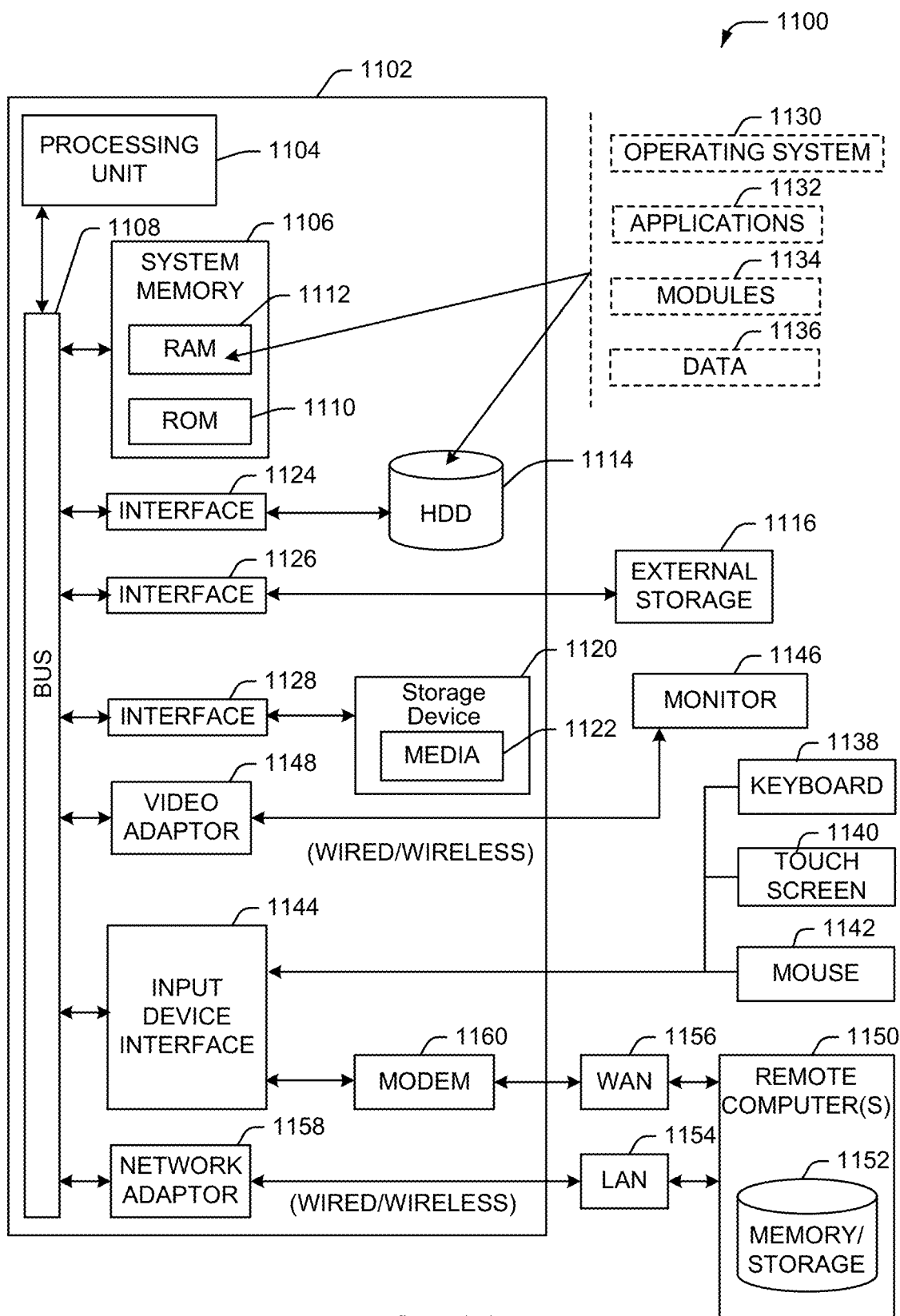
FIG. 11 depicts an example schematic block diagram of a computing environment with which the disclosed subject matter can interact/be implemented at least in part, in accordance with various aspects and implementations of the subject disclosure.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), and can include one or more external storage devices 1116 (e.g., a magnetic floppy disk drive (FDD) 1116, a memory stick or flash drive reader, a memory card reader, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114.

Other internal or external storage can include at least one other storage device 1120 with storage media 1122 (e.g., a solid state storage device, a nonvolatile memory device, and/or an optical disk drive that can read or write from removable media such as a CD-ROM disc, a DVD, a BD, etc.). The external storage 1116 can be facilitated by a network virtual machine. The HDD 1114, external storage device(s) 1116 and storage device (e.g., drive) 1120 can be connected to the system bus 1108 by an HDD interface 1124, an external storage interface 1126 and a drive interface 1128, respectively.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A method, comprising:
    determining, by a streaming data storage system comprising a processor, whether a request to truncate data stream events in a data stream that are prior to a specified stream cut stored in an auxiliary stream associated with the data stream is allowable, wherein timing in the auxiliary stream and timing in the data stream are based on a same system timing protocol, and the determining comprising:
        obtaining a retention period associated with the data stream;
        obtaining a stream cut time associated with the specified stream cut;
        evaluating the stream cut time relative to the retention period to determine that the stream cut time is within the retention period or that the stream cut time is not within the retention period;
        in response to determining that the stream cut time is within the retention period;
            determining that the request to truncate the data stream events is not allowable, and
            blocking the request, wherein the request to truncate the data stream events is received from a size-based expiration requestor. and the blocking of the request corresponds to increasing a capacity footprint of the data stream beyond a pre-specified size limit; and
        in response to determining that the stream cut time is not within the retention period;
            determining that the request to truncate the data stream events is allowable, and
            truncating the data stream based on the stream cut time in response to the request, wherein truncating the data stream comprises deleting the data stream events from the streaming data storage system.

2. The method of claim 1, further comprising:
    in response to the determining that the request to truncate the data stream events is not allowable, scheduling a future truncation operation based on the specified stream cut.

3. The method of claim 2, wherein the scheduling the future truncation operation comprises scheduling a delayed truncation operation to occur at a future stream cut time that is after the stream cut time and is not within the retention period.

4. The method of claim 1, wherein the evaluating the stream cut time relative to the retention period to determine that the stream cut time is within the retention period or that the stream cut time is not within the retention period comprises determining a retention period end time based on the stream cut time and the retention period, and determining whether the retention period end time is later than a current system time.

5. The method of claim 1, wherein the evaluating the stream cut time relative to the retention period to determine that the stream cut time is within the retention period or that the stream cut time is not within the retention period comprises determining a retention period start time based on a current system time and the retention period, and determining whether the stream cut time is earlier than the retention period start time.

6. The method of claim 1, further comprising:
    in response to determining that the stream cut time is not within the retention period, truncating the auxiliary stream based on the stream cut time.

7. The method of claim 1, wherein the retention period is based on a retention policy associated with the streaming data storage system.

8. A system, comprising:
    a processor; and
    a memory that stores executable instructions that, when executed by the processor, facilitate performance of operations, the operations comprising:
        determining whether a request to truncate data stream events is allowable, the data stream events being represented in a data stream prior to a specified stream cut stored in an auxiliary stream associated with the data stream, wherein timing in the auxiliary stream and timing in the data stream are based on a same system timing protocol, and the determining comprising,
            obtaining a retention period associated with the data stream;
            obtaining a stream cut time associated with the specified stream cut;
            evaluating the stream cut time relative to the retention period to determine that the stream cut time is within the retention period or that the stream cut time is not within the retention period;
            in response to determining that the stream cut time is within the retention period;
                determining that the request to truncate the data stream events is not allowable, and
                blocking the request, wherein the request to truncate the data stream events is received from a size-based expiration requestor. and the blocking of the request corresponds to increasing a capacity footprint of the data stream beyond a pre-specified size limit; and
        in response to determining that the stream cut time is not within the retention period:
            determining that the request to truncate the data stream events is allowable, and
            truncating the data stream based on the stream cut time in response to the request, wherein truncating the data stream comprises deleting the data stream events from the streaming data storage system.

9. The system of claim 8, wherein the operations further comprise:
    in response to the determining that the request to truncate the data stream events is not allowable, scheduling a future truncation operation based on the specified stream cut.

10. The system of claim 9, wherein the scheduling the future truncation operation comprises scheduling a delayed truncation operation to occur at a future stream cut time that is after the stream cut time and is not within the retention period.

11. The system of claim 8, wherein the evaluating the stream cut time relative to the retention period to determine whether the stream cut time is within the retention period comprises determining a retention period end time based on the stream cut time and the retention period, and determining whether the retention period end time is later than a current system time.

12. The system of claim 8, wherein the evaluating the stream cut time relative to the retention period to determine whether the stream cut time is within the retention period comprises determining a retention period start time based on a current system time and the retention period, and determining whether the stream cut time is earlier than the retention period start time.

13. The system of claim 8, wherein the operations further comprise:

in response to determining that the stream cut time is not within the retention period, truncating the auxiliary stream based on the stream cut time.

14. The system of claim 8, wherein the retention period is based on a retention policy associated with the data stream.

15. A non-transitory machine-readable medium, comprising executable instructions that, when executed by a processor, facilitate performance of operations, comprising:

determining whether a request to truncate data stream events in a data stream, which are prior to a specified stream cut stored in an auxiliary stream associated with the data stream is allowable, wherein timing in the auxiliary stream and timing in the data stream are based on a same system timing protocol, and the determining comprising, obtaining a retention period associated with the data stream;

obtaining a stream cut time associated with the specified stream cut;

evaluating the stream cut time relative to the retention period to determine that the stream cut time is within the retention period or that the stream cut time is not within the retention period;

in response to determining that the stream cut time is within the retention period;

determining that the request to truncate the data stream events is not allowable, and blocking the request, wherein the request to truncate the data stream events is received from a size-based expiration requestor. and the blocking of the request corresponds to increasing a capacity footprint of the data stream beyond a pre-specified size limit; and in response to determining that the stream cut time is not within the retention period;

determining that the request to truncate the data stream events is allowable, and truncating the data stream based on the stream cut time in response to the request, wherein truncating the data stream comprises deleting the data stream events from the streaming data storage system.

16. The non-transitory machine-readable medium of claim 15, wherein the operations further comprise:

in response to the determining that the request to truncate the data stream events is not allowable, scheduling a future truncation operation based on the specified stream cut.

17. The non-transitory machine-readable medium of claim 16, wherein the scheduling the future truncation operation comprises scheduling a delayed truncation operation to occur at a future stream cut time that is after the stream cut time and is not within the retention period.

18. The non-transitory machine-readable medium of claim 15, wherein the evaluating the stream cut time relative to the retention period to determine whether the stream cut time is within the retention period comprises determining a retention period end time based on the stream cut time and the retention period, and determining whether the retention period end time is later than a current system time.

19. The non-transitory machine-readable medium of claim 15, wherein the evaluating the stream cut time relative to the retention period to determine whether the stream cut time is within the retention period comprises determining a retention period start time based on a current system time and the retention period, and determining whether the stream cut time is earlier than the retention period start time.

20. The non-transitory machine-readable medium of claim 15, further comprising:

in response to determining that the stream cut time is not within the retention period, truncating the auxiliary stream based on the stream cut time.

\* \* \* \* \*